United States Patent
Littrell et al.

(10) Patent No.: US 12,122,328 B1
(45) Date of Patent: Oct. 22, 2024

(54) ADJUSTABLE CARGO ACCESSORY

(71) Applicant: FourMore LLC, Lake Mills, WI (US)

(72) Inventors: Nathan Littrell, Lake Mills, WI (US); Jon Helt, Lake Mills, WI (US)

( * ) Notice: Subject to any disclaimer, the term of this patent is extended or adjusted under 35 U.S.C. 154(b) by 0 days.

(21) Appl. No.: 18/294,256

(22) PCT Filed: Aug. 10, 2022

(86) PCT No.: PCT/US2022/039991
§ 371 (c)(1),
(2) Date: Feb. 1, 2024

(87) PCT Pub. No.: WO2023/018826
PCT Pub. Date: Feb. 16, 2023

Related U.S. Application Data

(60) Provisional application No. 63/232,320, filed on Aug. 12, 2021.

(51) Int. Cl.
*B60R 9/06* (2006.01)
*B60J 7/14* (2006.01)

(52) U.S. Cl.
CPC ............... *B60R 9/06* (2013.01); *B60J 7/141* (2013.01)

(58) Field of Classification Search
CPC .. B60R 9/06; B60R 7/142; B60R 7/19; B60R 7/198
USPC ............... 296/100.32, 36, 199.01, 2, 6, 7, 3; 224/402, 403, 405
See application file for complete search history.

(56) References Cited

U.S. PATENT DOCUMENTS

| 4,810,158 | A | 3/1989 | Bitzer |
| 5,009,457 | A | 4/1991 | Hall |
| 9,713,950 | B1 * | 7/2017 | Stoddard, Jr. .......... B60J 7/1621 |
| 11,305,624 | B2 | 4/2022 | Fleury |
| 2016/0332679 | A1 | 11/2016 | Krishnan et al. |
| 2021/0031604 | A1 | 2/2021 | Fleury |

OTHER PUBLICATIONS

US ISA, Outgoing—PCT/ISA/237—International Search Report of the International Searching Authority (ISA) for PCT Application No. PCT/US22/39991, Mailed Dec. 30, 2022.
US ISA, Outgoing—PCT/ISA/237—Written Opinion of the International Searching Authority (ISA) for PCT Application No. PCT/US22/39991, Mailed Dec. 30, 2022.
US ISA, Outgoing—PCT/IPEA/409—International Preliminary Report on Patentability for PCT Application No. PCT/US22/39991, Mailed Dec. 20, 2023.

\* cited by examiner

*Primary Examiner* — Dennis H Pedder

(57) ABSTRACT

A vehicle rack assembly and method is disclosed which includes a base frame having a first side member, a second side member, and a cross structure extending between the first side member and the second side member wherein the rack assembly is configured to cover a bed of a vehicle. The rack assembly also includes a first panel pivotably coupled to the first side member and a first auxiliary panel pivotably coupled to the first panel and a second panel pivotably coupled to the second side member and a second auxiliary panel pivotably coupled to the second panel. The rack assembly is adjustable between a first configuration where the first panel and the second panel are co-planar and a second configuration where the first panel, first auxiliary panel, second panel, and second auxiliary panel are each oriented at an angle to the base plane.

20 Claims, 10 Drawing Sheets

ADJUSTABLE CARGO ACCESSORY

CROSS REFERENCE TO RELATED APPLICATIONS

U.S. Provisional application No. 63/232,320, filed on Aug. 12, 2021.

TECHNICAL FIELD

The present disclosure relates to vehicle cargo accessories, and more particularly to an adjustable cargo bed accessory for a truck.

BACKGROUND

Pickup trucks are popular forms of transportation in the United States, in part because of the versatility offered by the truck's bed. Many are owned casually, not for work- or task-specific purposes, but rather as a daily driver that can also be used for a variety of additional tasks: transporting recreational gear; hauling brush, trash or furniture; or carrying supplies for landscaping or home improvement projects, etc.

40% of pickup owners accessorize their vehicles to increase their versatility, and each year more than $3 billion is spent on such "exterior utility" accessories: to allow transportation of cargo too long to be carried in the bed (e.g., a ladder, a canoe or lumber) or too wide (e.g., box springs, an ATV, or large furniture) or tall (e.g., a bookshelf or refrigerator); or when cargo needs to be stacked; or when cargo might spill over the sides of the bed (e.g., loads of leaves or brush); or when the cargo should be protected from the elements (e.g. tools, hunting equipment or pets). Other accessories provide for the secure attachment of specialized equipment: bicycle or kayak carriers, tents, or off-roading accessories.

Conventional accessories fall into several categories. "Ladder racks" allow the transportation of items longer than the truck bed by suspending them lengthwise over the truck's cab and bed. "Sideboards" sit over the sides of the bed to raise the effective height of the bedsides and increase the bed's usable volume. Soft or (more typically) hard "toppers" or "caps" secure cargo within the bed against theft or weather. Soft or hard "tonneau covers" protect cargo against weather. Racks install in the bed allow for carrying of bicycles, roof-top tents, ATVs, or off-road gear. Cargo management systems allow for the truck bed to be used like the trunk of a car (e.g., Decked, etc.).

However, these conventional accessories are task and application specific, increasing the versatility of the truck in only one respect. For example, an owner who wants to occasionally haul lumber suspended over the cab must buy a conventional ladder rack, and that same owner also wants to securely transport an ATV; a separate utility rack must be purchased and separately installed. Furthermore, if the owner wants to haul a tall load of leaves; separate sideboards must be purchased and/or built and installed.

In addition, installing one conventional accessory typically precludes the installment of any additional accessories. As such, conventional accessories prevent configuring the truck to perform other tasks without the truck owner buying multiple accessories and continually uninstalling and reinstalling the correct accessory for whatever task is at hand. Many conventional accessories are designed to be installed on a semi-permanent basis, and do not facilitate easy removal/reinstallation; and may require professional assistance. Therefore, many truck owners buy a single conventional accessory and are forced to accept the limitations imposed by that accessory. For example, an owner who wants the ability to carry lumber can buy and install a conventional ladder rack, but will then not be able to install sideboards, a topper, or rack to transport an ATV.

SUMMARY

It is the object of the invention to provide a rack assembly with panels which spans the bed of a vehicle, such as a pickup truck and sits on the siderails of the bed, wherein the rack assembly sits on the top of the side panels defining the bed and is adjustable from a first configuration wherein the rack assembly panels lays flat across the bed, providing additional storage space in addition to the bed, and a second configuration wherein the rack assembly panels are adjusted to secure at an angle, thereby providing yet additional storage space or accessory anchor points.

Another object of the invention is to provide a rack assembly which provides additional multifunctional storage and use capabilities to the bed of a vehicle.

In accordance with a first embodiment, the invention relates to a rack assembly which comprises a base frame comprising a first side member, a second side member, and a cross structure (headache rack) extending between the first side member and the second side member. In addition, the rack assembly further comprising a first panel pivotably coupled to the first side member and a second panel pivotably coupled to the second side member, where the panels are adjustable to a first configuration in which the first panel and the second panel are co-planar and parallel to the base frame and a second configuration where the first panel and the second panel are each oriented at an angle to the base plane. The rack assembly may also comprise a cross member extending between the first side member and the second side member and in communication with the tailgate of a vehicle as well as a cross member connecting the first panel and the second panel.

In accordance with a second embodiment, the invention relates to a rack assembly comprising a base frame comprising a first side member, a second side member, and a cross structure extending between the first side member and the second side member. The rack assembly further comprises a first panel pivotably coupled to the first side member, a first auxiliary panel rotatably coupled to the first panel, a second panel pivotably coupled to the second side member, and a second auxiliary panel pivotably coupled to the second panel, wherein the first panel and second panel are configured to rotate toward each other and the first auxiliary panel and the second auxiliary panel are also configured to rotate toward each other. In addition, the rack assembly further comprises a crossbeam which connects to the first panel and the second panel.

In accordance with another embodiment, the first panel and the second panel each further comprise at least one subpanel which provides access to the vehicle bed. In accordance with an additional embodiment, the invention relates to a rack assembly where the first auxiliary panel and second auxiliary panel are adjustable to rest on top of the first crossbeam.

Other aspects of the disclosure will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified. Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
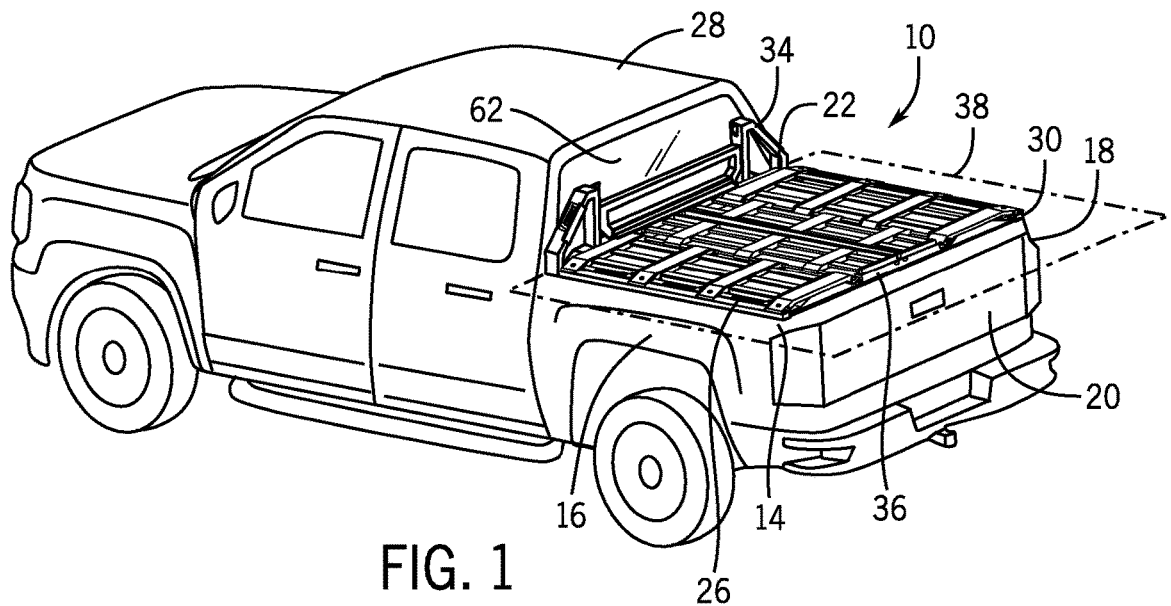
FIG. 1 is a perspective view of an embodiment of a rack assembly on a vehicle, with the rack assembly in a first configuration (a down configuration)

A rack assembly and method will now be described with references in FIGS. 1-14. Turning to the drawings, where the reference characters indicate corresponding elements throughout the several figures, attention is first directed to FIG. 1 a perspective view of an embodiment of a rack assembly on a vehicle, with the rack assembly in a first configuration (a cargo rack down configuration) is shown, illustrating its composition and the apparatus is generally indicated by reference character 10. Rack assembly 10 is coupled over a bed 14 of a vehicle 12 which comprises and is defined by defined by a cab 28, first side panel 16, a second side panel 18, and a tailgate 20 (e.g., a pickup truck). Rack assembly 10 comprises a base frame 22 which further comprises a first side member 26, a second side member 30, a cross structure 34 (referred to as a headache rack throughout the rest of the specification) extending between one end of the first side member 26 and one end of the second side member 30 closest to cab 28 of vehicle 12 and a cross member 36 extending from the other side of the first side member 26 and the other side of the second side member 30. In the current embodiment the base frame 22 is square or rectangular shaped may be other shapes if desired. Base frame 22 defines a base plane 24 and first side member 26 lies along the top rail of first side panel 16, cross member 36 lies along the top rail of second side panel 18, and second side member 30 lies along the top of tailgate 20, wherein base frame 22 is parallel to truck bed 14.

Figure 2:
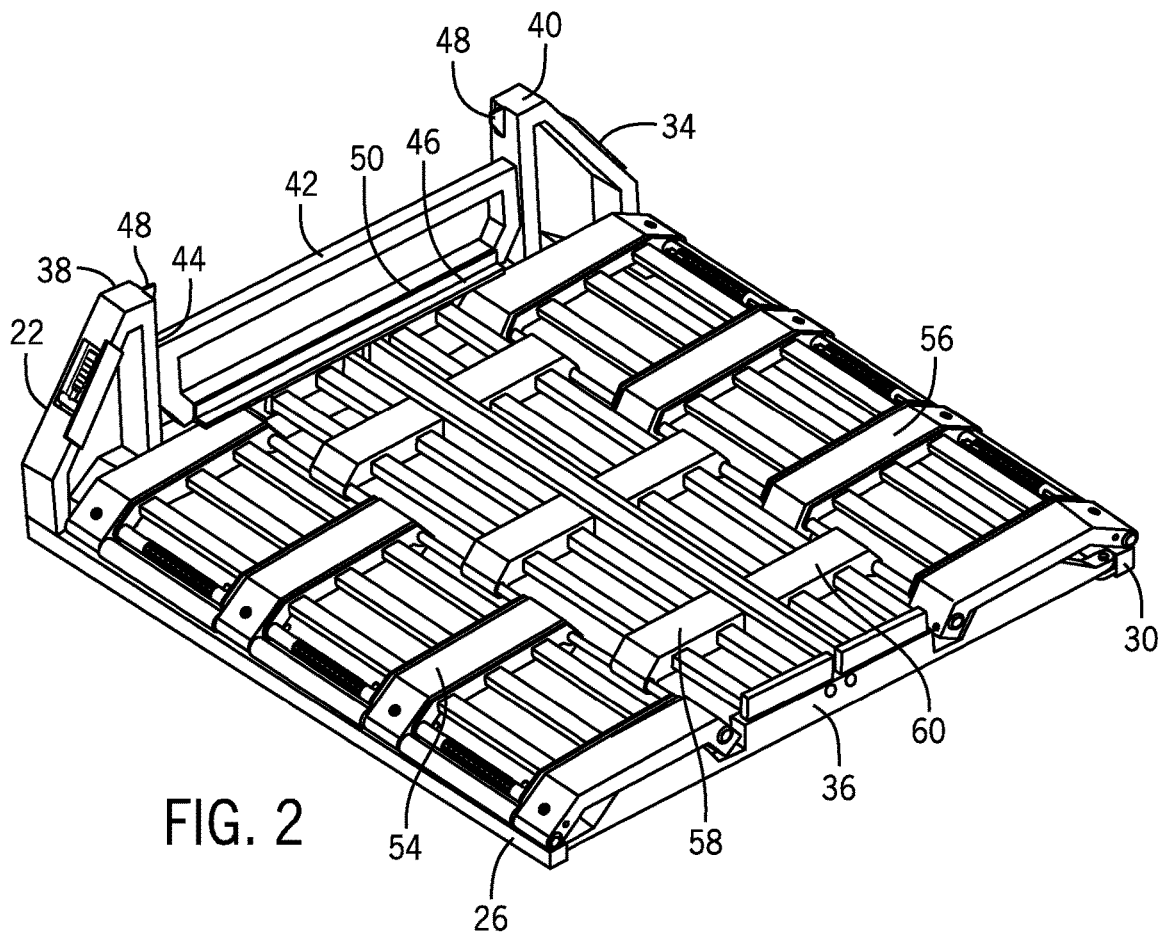
FIG. 2 is a perspective view of an embodiment of the rack assembly in the first configuration.

Turning to FIG. 2, a perspective view of an embodiment of the rack assembly in the first configuration is shown. Rack assembly 10 further comprises a first panel 54 pivotably coupled to the first side member 26 and a second panel 56 is pivotably/rotatably coupled to the second side member 30, where first panel 54 and second panel 56 are mirror images of each other. In addition, rack assembly 10 further comprises a first auxiliary panel 58 pivotably coupled to first panel 54 and a second auxiliary panel 60 pivotably coupled to second panel 56. In the first configuration of rack assembly 10, first panel 54, first auxiliary panel 58, second panel 56, and second auxiliary panel 60 lay flat or are co-planar across the top of bed 14 of vehicle 12 and parallel with base plane 24.

With continued reference to FIG. 2, headache rack 34 is removably or permanently coupled to first side member 26 and second side member 30 and oriented substantially perpendicular to base plane 24. In the illustrated embodiment, cab 28 has a rear window 62, wherein headache rack 34 at least partially covers window 62 of vehicle 12. Headache rack 34 comprises a support bar 44 (see FIG. 9) extending along base plane 24 and a left leg 38 located on one side of support bar 44 and extending perpendicular to support bar 44 and a right leg 40 located on the other side of support bar 44 and also extending perpendicular to support bar 44 in the same direction and in line with left leg 38. Headache rack 34 further comprises an arm 42 located in between left leg 38 and right leg 40 which is rotatably coupled to left leg 38 and right leg 40, allowing arm 42 to rotate from a first position 50 (as shown in FIG. 2) and a second position 52 (see FIG. 4). While arm 42 is currently rectangular or "D" shaped, other shapes which accomplish the same purpose are contemplated. While arm 42 is rotatably couple to left leg 38 and right leg 40 along one length, arm 42 further comprises an extension or lip 46 affixed to the other length and extends perpendicular to and away from said other length, wherein extension 46 is configured to communicate, when arm 42 is rotated down, with first panel 54, second panel 56, first auxiliary panel 58, and second auxiliary panel 60, thereby locking them all in a coplanar configuration (the first configuration). When arm 42 is rotated downward, arm 42 along with left leg 38 and right leg 40 provides protection of vehicle 12 occupants from any cargo in bed 14 or stored on rack assembly from potentially sliding forward into the rear window 62 of cab 28 because of, for example, emergency braking. Left leg 38 further comprises a protrusion 48 configured to extend away from the inside of left leg 38 and located above where arm 42 is connected to left leg 38 and further configured to communicate with arm 42 and to stop rotation of arm 42 when it is rotated up and away from support bar 44, thereby unlocking first panel 54, second panel 56, first auxiliary panel 58, and second auxiliary panel 60 to allow each panel to move into a second configuration (see FIG. 5). In the current embodiment protrusion 48 is located to allow arm 42 to rotate 180 degrees to second position 52 in relation to first position 50, although protrusion 48 may be adjusted to allow different amounts of rotational movement of arm 42. Likewise, right leg 40 further comprises a protrusion 48 in a mirrored configuration as protrusion 48 on left leg 38. It is contemplated arm 42 is able to be locked to left leg 38 and right leg 40 when rotated downward (first position 50) in the first configuration and when rotated upward (second position 52) in the second configuration of rack assembly 10.

In the first configuration, rack assembly 10 serves as a rack upon which cargo (e.g., ATV, bicycles, kayaks, rooftop-mounted tents, or off-road adventure gear) can be carried while suspended over the vehicle bed 14. No portion of rack assembly 10 extends into the vehicle's bed 14 area because rack assembly 10 is supported on base frame 22, which is seated on the top rails of first side panel 16, second side panel 18, and tailgate 20 of bed 14. As such, rack assembly 10 in the first configuration advantageously allows: (1) the transportation of another "layer" of cargo in the otherwise empty bed 14 underneath; (2) the installation of a cargo management system in the bed (e.g., a DECKED® box system); or (3) the installation of certain hard or soft roll-up tonneau covers (e.g., Truxedo® Lo-Pro). In some embodiments, additional rooftop device to secure bikes, kayaks, etc. (Thule and Yakima) easily attach to rack assembly 10 in the first configuration.

Figure 3:
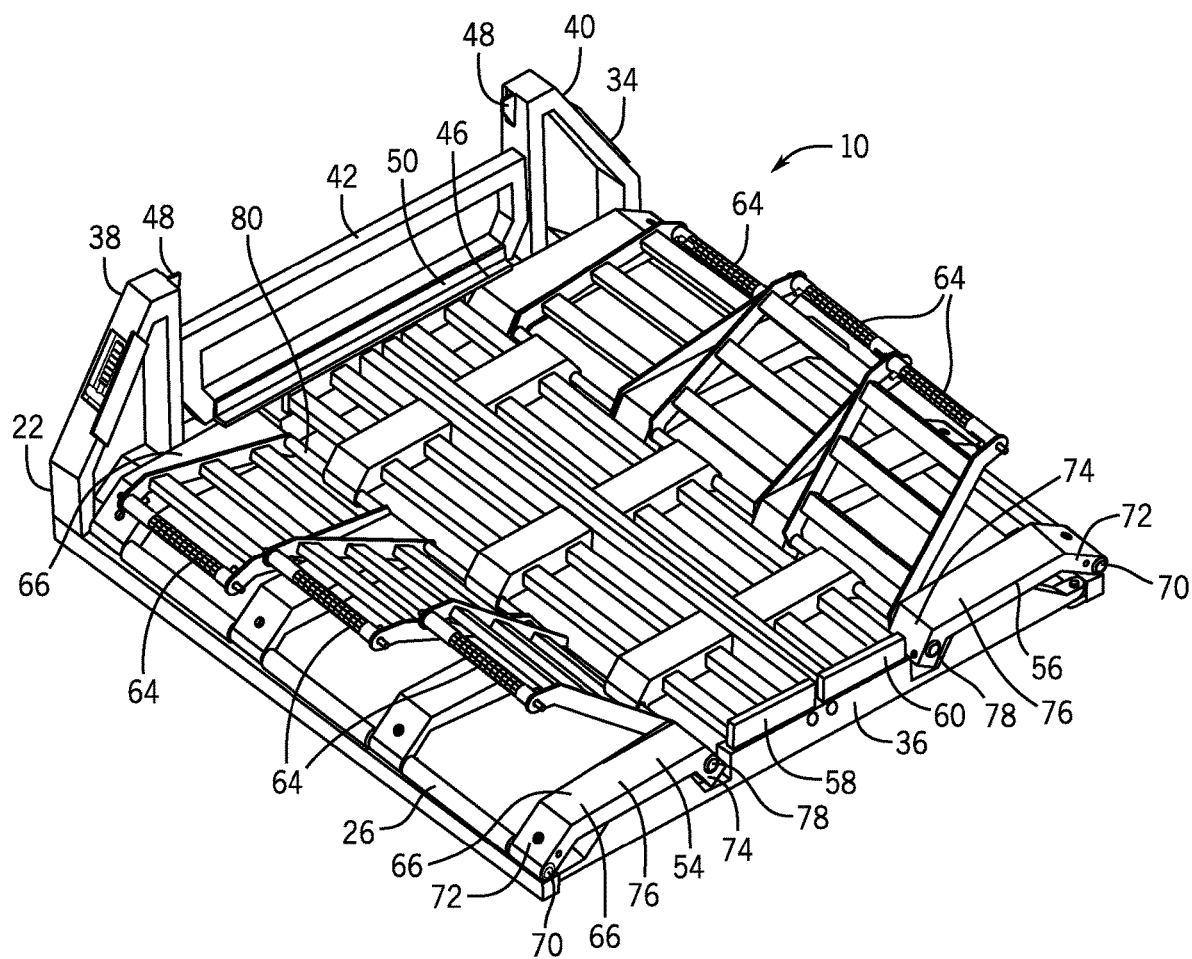
FIG. 3 is a perspective view of the rack assembly with subpanels 64 of first panel 54 and second panel 56 in partially open positions.

Turning to FIG. 3, a perspective view of the rack assembly with adjustable subpanels 64 of first panel 54 and second panel 56 in partially open positions is shown. First panel 54 comprises at least two lateral members 66 and at least one subpanel 64, with the current embodiment including four lateral members 66 and three subpanels 64 all of which are in line with one another and extend along the length of first side member 26, where one lateral member 66 is located on each side of each subpanel 64. Each subpanel 64 is configured to allow a person to rotate the subpanel 64 up and away from first panel 54 in order to access the interior space of bed 14. Each lateral member 66 is preferably rectangular and comprises a left side 72, a right side 74, and a center 76 with left side 72 bent in relation to center 76 at about 145 degrees in relation to center 76 and right side is bent in relation to center 76 at about 125 degrees in relation to center 76 so that lateral member 66 make a "C" shape. It should be noted that the angle of left side 72 and right side 74 in relation to center 76 may be varied as desired for different applications, for example left side 72 and/or right side 74 may be parallel (straight) in relation to center 76 (see FIG. 13). Further, left side 72 further comprises an aperture 70 formed therethrough and configured to allow a first rod 68 (see FIG. 10) to extend through aperture 70 into first side member 26, thereby securing first panel 54 to first side member 26 in rotational communication.

In addition, right side 74 of lateral member 66 comprises an aperture 78 formed therethrough and configured to allow a second rod 80 to extend through said aperture 78 thus and through each subpanel 64, thereby allowing each subpanel 64 to rotate upward and securing each subpanel 64 within first panel 54. In addition, subpanel 64 may lock/unlock to left side 72 of lateral member 66 by extending a peg 94 (see FIG. 4 and description below) from subpanel 64 into an additional aperture formed in lateral member 66 (not shown). Each first rod 68 and second rod 80 may have its end flanged, made wider than apertures 78 and 80, or secured to ensure lateral members 66 and each subpanel 64 remained sandwiched within the length of each rod. Second panel 56 is in a mirrored configuration to first panel 54, thereby rotatably attached to second side member 30 and comprising at least one subpanel 64. Components of rack assembly 10, including but not limited to, base frame 22, first panel 54, second panel 56, first auxiliary panel 58, second auxiliary panel 60, cross member 36, a first crossbeam 102, first rod 68, and second rod 80, are presently made of steel but other materials such as wood, plastic, and other types of metal (and/or a combination thereof) are contemplated.

Figure 4:
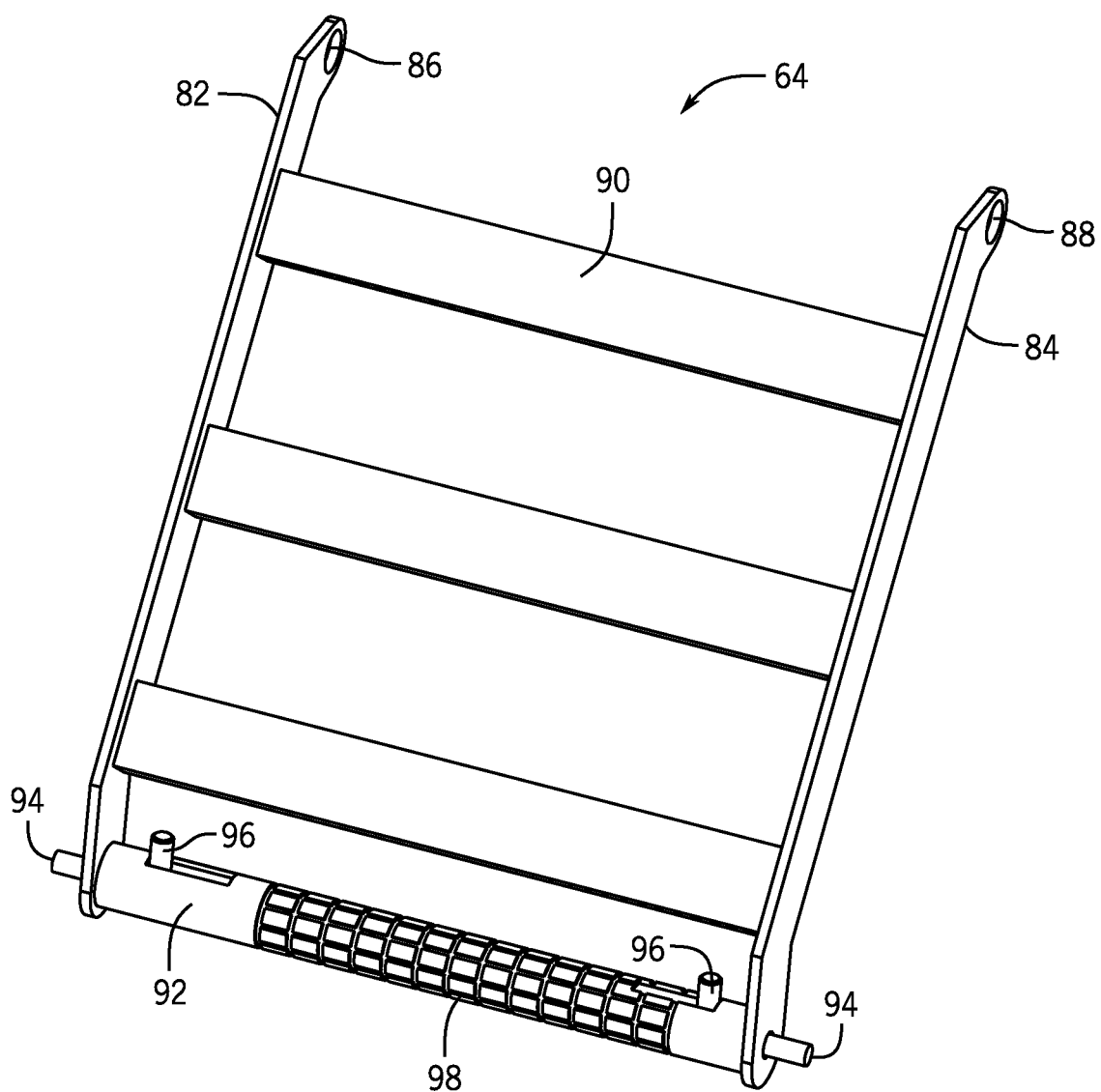
FIG. 4 is a perspective view of an embodiment of subpanel 64.
Figure 5:
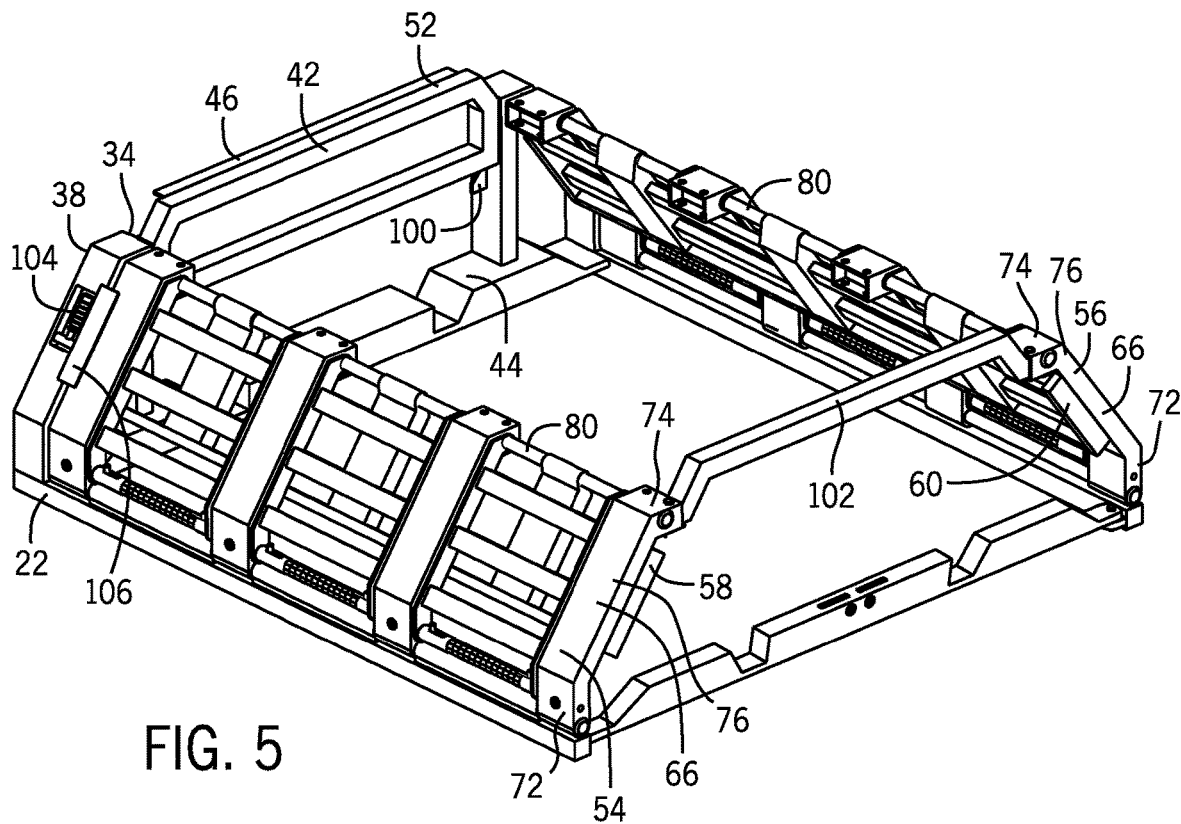
FIG. 5 is a perspective view of an embodiment of the rack assembly in a second configuration (an up configuration)
Figure 6:
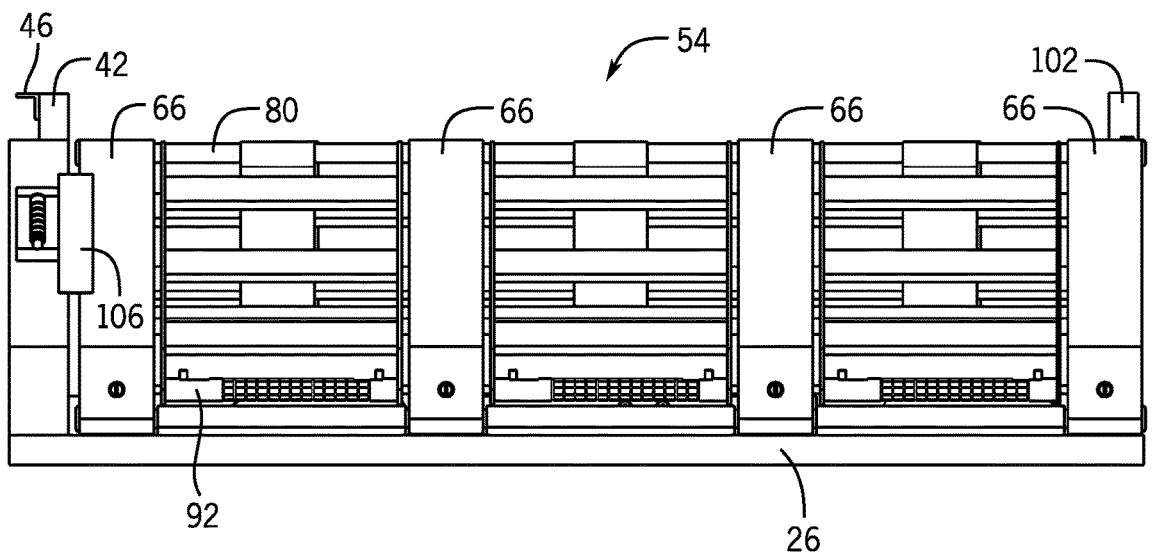
FIG. 6 is a left side view of an embodiment of the rack assembly in the second configuration.
Figure 7:
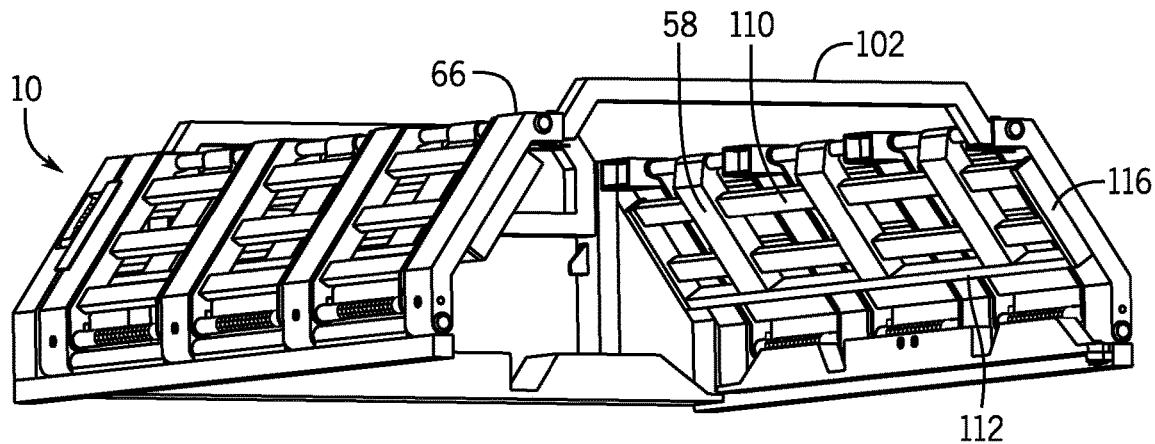
FIG. 7 is a bottom perspective view of an embodiment of the rack assembly in the second configuration.

Turning to FIG. 4, a perspective view of an embodiment of subpanel 64 is shown.

Subpanel 64 comprises a left side 82 that is "C" shaped with a passage 86 formed through one side and configured to allow second rod 80 to pass through it and an aperture formed on the other side to allow a peg 94 to extend into a neighboring lateral member 66 to secure subpanel 64 from movement as well as allow subpanel 64 to be disengaged from lateral member 66 and rotated or opened. When desired. Peg 94 is connected to bolt 96 confined within at least one side of handle 92 connected on one end to left side 82, wherein a user can move bolt 96 away from left side 82 to disengage peg 94 from it neighboring lateral member 66. Likewise Subpanel 64 further comprises a right side 84 located on the other side of handle 92 in the same shape and configuration as left side 82 with a passage 88 formed therethrough one end and configured to allow a second rod 80 to extend through it and an aperture on the other end to allow another instance of peg 94 (and bolt 96) on the opposing side of handle 92 to extend into and retract from the neighboring lateral member 66 neighboring right side 84. Handle 92 further may have texture 98 around the circumference thereof to assist a user in opening and closing subpanel 66. Finally, at least one bar 90 extends from left side 82 to right side 84 to create structural support of subpanel 64. In the current embodiment there are three bars 90 equidistantly spaced along the lengths of and in between left side 82 and right side 84 but other configurations are contemplated. Second panel 56 is the same configuration and composition as first panel 54 just described however second panel 56 is in a mirrored configuration in comparison to first panel 54 and is rotatably connected to second side member 30 (via a first rod 68, see FIG. 10). Turning to FIGS.

5-7, a perspective, left side, and bottom perspective view of an embodiment of the rack assembly in a second configuration (an up configuration) is shown. In the second configuration, first panel 54 and the second panel 56 are angled with respect to base plane 24. To translate from the first configuration (down) to the second configuration (up), arm 42 is rotated (180 degrees in the current embodiment) to second position 52, so that extension 46 is not in communication with first panel 54, second panel 56, first auxiliary panel 58, or second auxiliary panel 60, so they are each free to move. Next, first panel 54 and/or second panel 56 is rotated upward and locked into an angled position by locking mechanism 104 located within left leg 38 of headache rack 34, wherein locking mechanism 104 may be a movable shaft which extends into an aperture formed in the side of lateral member 66 of first panel 54 that is closest to left leg 38. Locking mechanism 104 may be utilize the peg 94/bolt 96 configuration used to lock/unlock subpanel 64. Next, first auxiliary panel 58 is rotated underneath first panel 54 and locked to first panel 54 (preferably by a clip, clamp, pin, fastener, moveable peg, or other known fixation mechanism). Likewise, the same process is followed for the remaining panel and auxiliary panel (second panel 56 and second auxiliary panel 56 in this case) thereby configuring rack assembly 10 to resemble a truck cap. Next, to further support first panel 54, second panel 56, first auxiliary panel 58, and second auxiliary panel 60 in this second configuration, rack assembly 10 further comprises a at least one crossbeam 102 which extends between first panel 54 and the second panel 56 (additional crossbeams 102 may be added if desired). In the current embodiment crossbeam 102 releasably connects to right side 74 of the lateral member 66 located on the end of first panel 54 and located on the opposite side of rack assembly 10 from headache rack 34. Crossbeam 102 also connects to the right sight 74 of the lateral member 66 located on the end of second panel 56 and located on the opposite side of rack assembly 10 from headache rack 34. Crossbeam 102 is configured to connect to lateral member 66 or can potentially any portion of first panel 54 and second panel 56. Crossbeam 102 provides structural support for first panel 54 and second panel 56 and the overall structure of rack assembly 10 when in the second configuration. The second configuration of rack assembly 10 provides for the transportation of a large volume of awkward cargo, such as leaves or mulch, and also prevents upright items from falling over the sides of vehicle bed 14. Uniquely, first panel 54 and second panel 56 can then be folded down and out of the way (i.e., the first configuration) when not in use. It should be noted left leg 38 and right leg 40 of headache rack 34 could be configured to provide lock mechanism 104 to be alternatively located so that first panel 54 and second panel 56 could be locked into a 90 degree position that is perpendicular to truck bed 14, thereby providing additional potential functionality for a user. Further, headache rack 34 could also be configuration to allow first panel 54 and second panel 56 to rotate outward away from bed 14 and the vehicle, thereby allowing cargo storage capabilities for oversized materials.

Headache rack 34 further comprises a second protrusion 100 located on left leg 38 and on right leg 40 on the same surfaces as first protrusion 48 and configured to stop the rotation of arm 42 in the first position 50. Further, Arm 42 may be removably secured to left leg 38 and right leg 40 in first position 50 and/or second position 52 by using fasteners such as pins, bolts, screws, fasteners, or other known securement methods. Left leg 38 and right leg 40 may each further comprise a plate 106 fixed near each lock mechanism 104 in order to limit the amount of rotation of first panel 54 about first side member 26 and limit the amount of rotation of second panel 56 about second side member 30.

Figure 8:
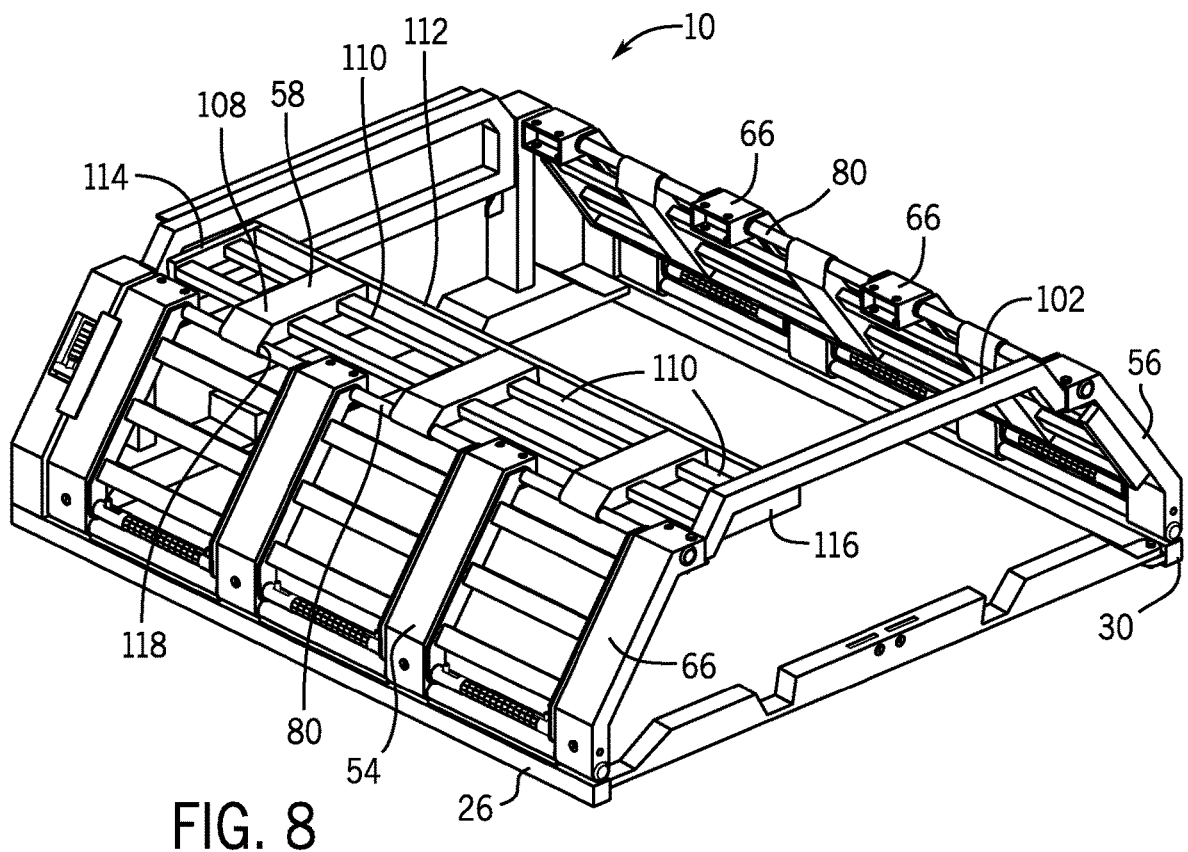
FIG. 8 is a perspective view of an embodiment of the rack assembly with first auxiliary panel 58 in an articulated position.

Turning to FIG. 8, a perspective view of an embodiment of the rack assembly with first auxiliary panel 58 in an articulated position is shown. First auxiliary panel 58 is generally rectangular shaped and comprises at least one auxiliary lateral member 108 (three in the current embodiment) equidistantly located along the length of auxiliary panel 58 and is configured to rotatably attach to second rod 80 via an orifice 118 formed therethrough one end wherein the other end of auxiliary lateral member 108 is fixed to a top bar 112. Top bar 112 extends along the length of auxiliary panel 58 (extending perpendicular to each auxiliary lateral member 108) and defines one side of panel 58, wherein one end of top bar 112 is fixed to a first side bar 114 which extends perpendicular to top bar 112 in the same direction as, and parallel with, each auxiliary lateral member 108 and defines one of the widths of panel 58. The other end of top bar 112 is fixed to a second side bar 116 which also extends perpendicular to top bar 112 in the same direction as first side bar 114, and defines the other width of panel 58. Auxiliary panel 58 further comprises at least one horizontal bar 110 which is connected to an auxiliary lateral member 108 and extends along the length of auxiliary panel 58 to connect to either the first side bar 114, second side bar 116, or another auxiliary lateral member 108. In the current embodiment there is a pair of horizontal bars 110 extending from first side bar 114 to an auxiliary lateral member 108, another pair of horizontal bars 110 extending between each auxiliary lateral member 108 and the neighboring auxiliary member 108 and a pair of horizontal bars 110 extending from the second side bar 116 and an auxiliary lateral member 108, providing an anchor point for objects such as ropes, ties, hooks and/or clamps as well as provide surface area for cargo storage when rack assembly 10 is in the first configuration. First auxiliary panel 58 may be different configurations such as a solid piece of material or a plurality of solid pieces of material if desired. First auxiliary panel 58 may rotate about second rod 80 freely or may have predetermined to lock panel 58 in a specific articulation, like the one shown in FIG. 8 for additional desired uses, such as additional cargo storage on top of rack assembly 10. In addition, while it is shown that first auxiliary panel 58 is located below crossbeam 102, first auxiliary panel 58 may be located above crossbeam 102 and even configured to rest on crossbeam 102. Likewise, second auxiliary panel 60 is the same composition and configuration as first auxiliary panel 58 except that it is in a mirrored configuration, so it is rotatably or pivotably connected to second rod 80 which is also connected to second panel 56 on the other side of rack assembly 10, which is further connected to second side member 30.

Figure 9:
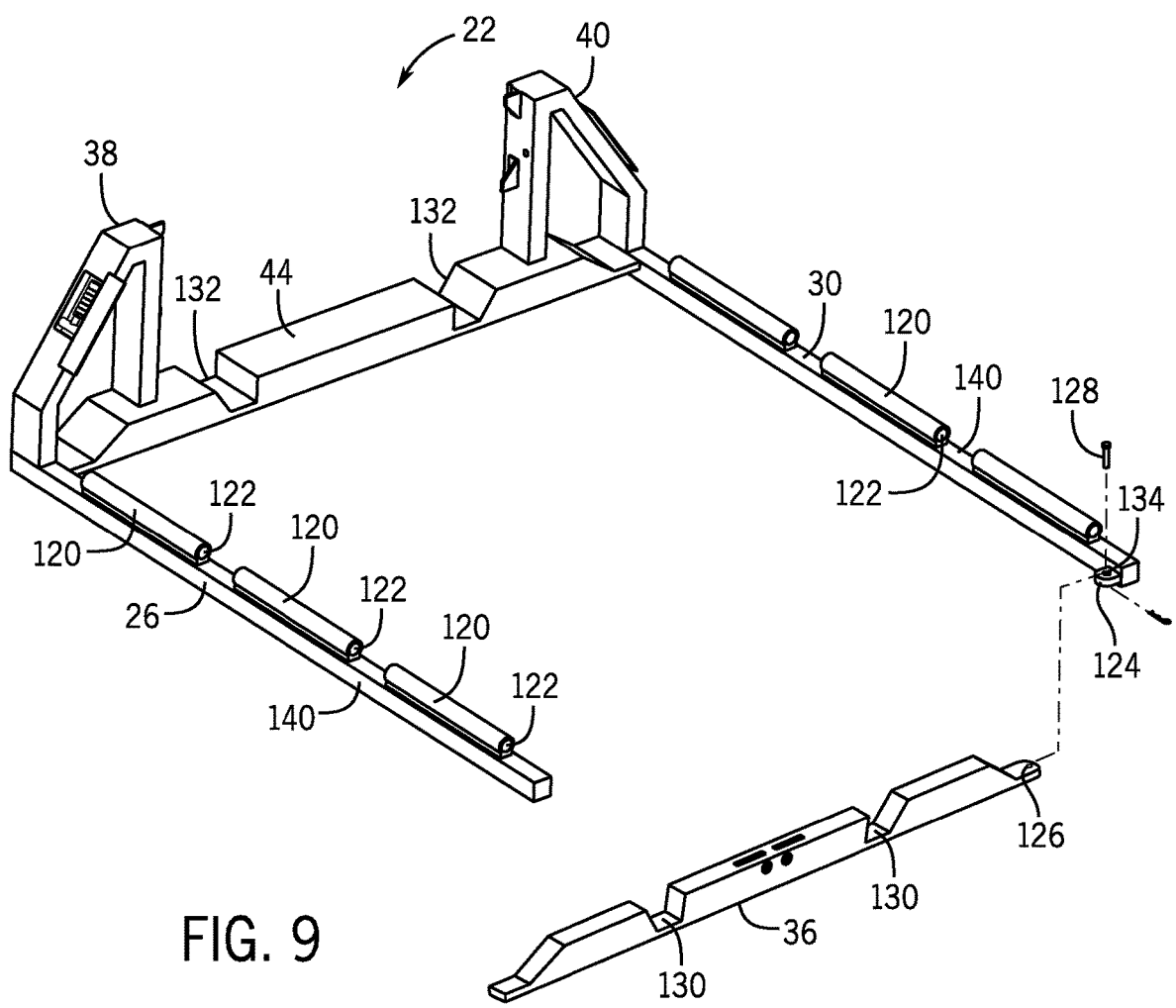
FIG. 9 is a perspective view of an embodiment of base frame 22.

Turning to FIG. 9, a perspective view of an embodiment of base frame 22 is shown. First side member 26 and second side member 30 each comprise a structural bar 140 extending the length of bed 14 and each connect to headache rack 34 on one side and first cross member 36 on the other. While first side member 26 and second side member 30 have the same composition and configuration in the current embodiment, each may be altered if desired in alternative embodiments. First side member 26 and second side member 30 further comprise at least one tube 120 fixed to the top surface of structural bar 140 (or formed integral with bar 140) where tube 120 further comprises an aperture 122 formed therethrough and configured to receive and communicate with first rod 68 (allowing rod 68 to freely rotate), thereby creating a hinge for first panel 54 and second panel 56 to rotate about. In the current embodiment three tubes 120 are fixed to structural bar 140 and located equidistant to one another along the length of each bar 140.

In the current embodiment second side member 30 does have one difference from first side member 26. Second side member 30 further comprises an anchor point 124 with an aperture 134 formed therethrough. Anchor point 124 is connected to the interior surface of the end of second side member 30 opposite of headache rack 34 and extending perpendicular to second side member 30 towards first side member 26 and is configured to connect to first cross member 36 via pin a 128 extending through aperture 134, thereby creating a hinge so first cross member 36 (via an aperture 126 formed through one end) can pivot about anchor point 124. First cross member 36 is also configured to removably secure to first side member 26 via a bolt, pin, latch, or other temporary securement mechanism. The ability of first cross member 36 to pivot about anchor point 124 allows first cross member 36 to be moved or temporarily secured against second side member 30 or rotated outward away from rack assembly 10 temporarily in order to load or remove cargo within bed 14; cross member 36 can then to be resecured between first side member 26 and second side member 30 again to provide additional structural support to base frame 22. It is also contemplated that cross member 36 could instead be latched to both first side member 26 and second side member 30 without the ability to pivot about second side member 30. In addition, an anchor point 124 could be attached instead to first side member 26 or to both first side member 26 and second side member 36 and first cross member 36 is configured to be two separate pieces which latch together, wherein one portion of cross member 36 is rotatably attached to an anchor point 124 on first side member 26 and the other portion of cross member 36 is rotatably attached to an anchor point 124 on second side member 30. Pin 128 while in the current embodiment comprises a bolt and cotter pin, could comprise other anchoring means known in the art. In the current embodiment cross member 36 is primarily rectangular with at least one notch 130 cut into the top of member 36 and configured to receive right side 74 of lateral member 66 of first panel 54 and an additional notch 130 in a mirrored configuration and configured to receive the right side 74 of lateral member 66 second panel 54. Likewise, support bar 44 of headache rack 34 also comprises at least one notch 132 in the same shape and configuration as each notch 130 on cross member 36 to receive the portion of the right side 74 of the lateral member 66 on first panel 54 or second panel 56 closest to headache rack 54. Notches 130 and notch 132 allow first panel 54 and second panel 56 to lay flat when rack assembly 10 is in the first configuration due to the angled sides of lateral members 66. It is contemplated that lateral member 66 may be a different shape, such completely straight or partially straight, in which case notches 130 and notches 132 may not be needed. (see FIGS. 13-15).

Figure 10:
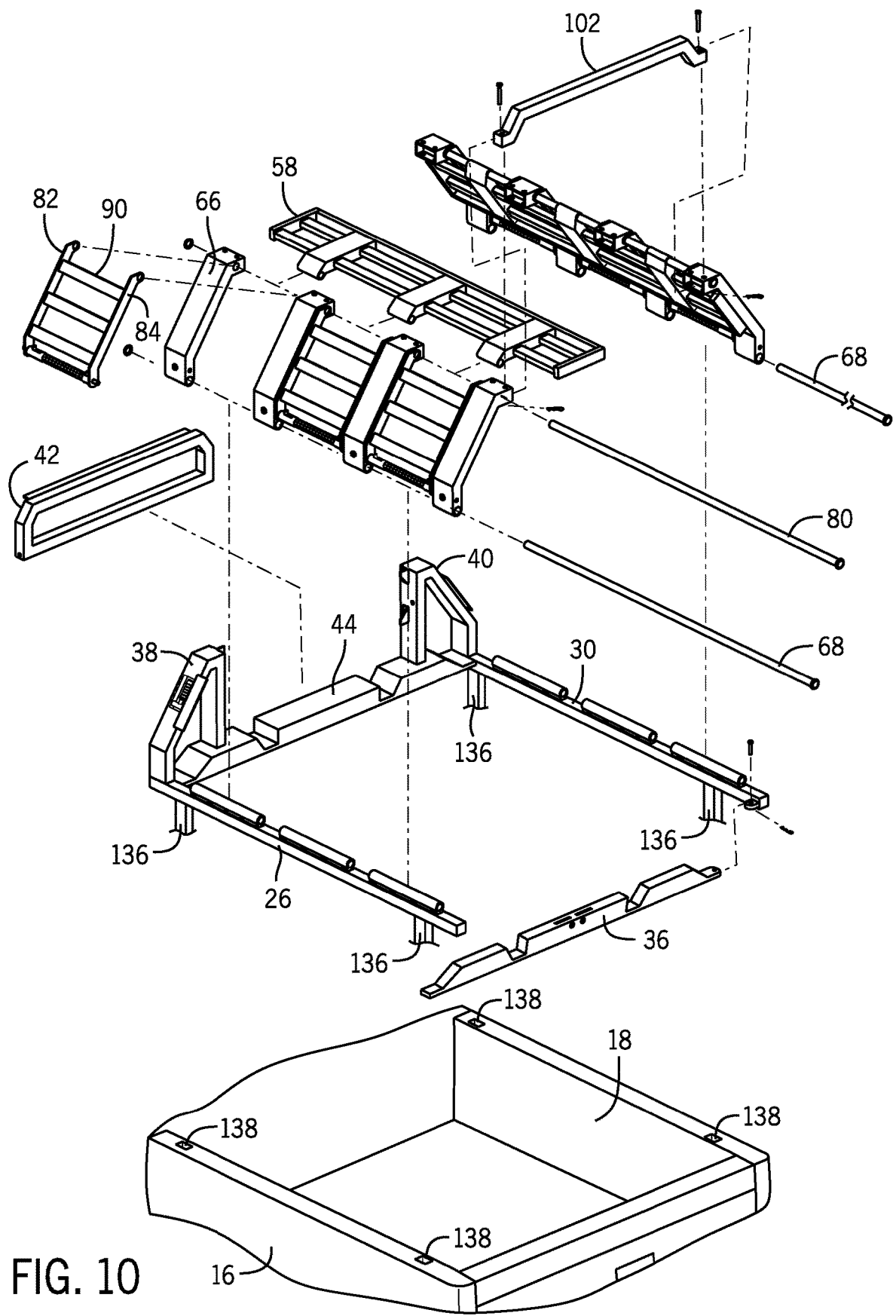
FIG. 10 is an exploded view of an embodiment of the rack assembly.

Turning to FIG. 10, an exploded view of an embodiment of the rack assembly is shown. First side member 26 and second side member 30 each further comprises at least one vertical bar 136 extending from the bottom surface of first side member 26 and each vertical bar 136 is configured to affix to a stake-pocket 138 in the bed 14 of vehicle 12 (usually located in the first side panel 16 and second side panel 16 of the vehicle and accessible from the top of each side panel), thereby securing rack assembly 10 to the bed 14 of vehicle 12.

Figure 11:
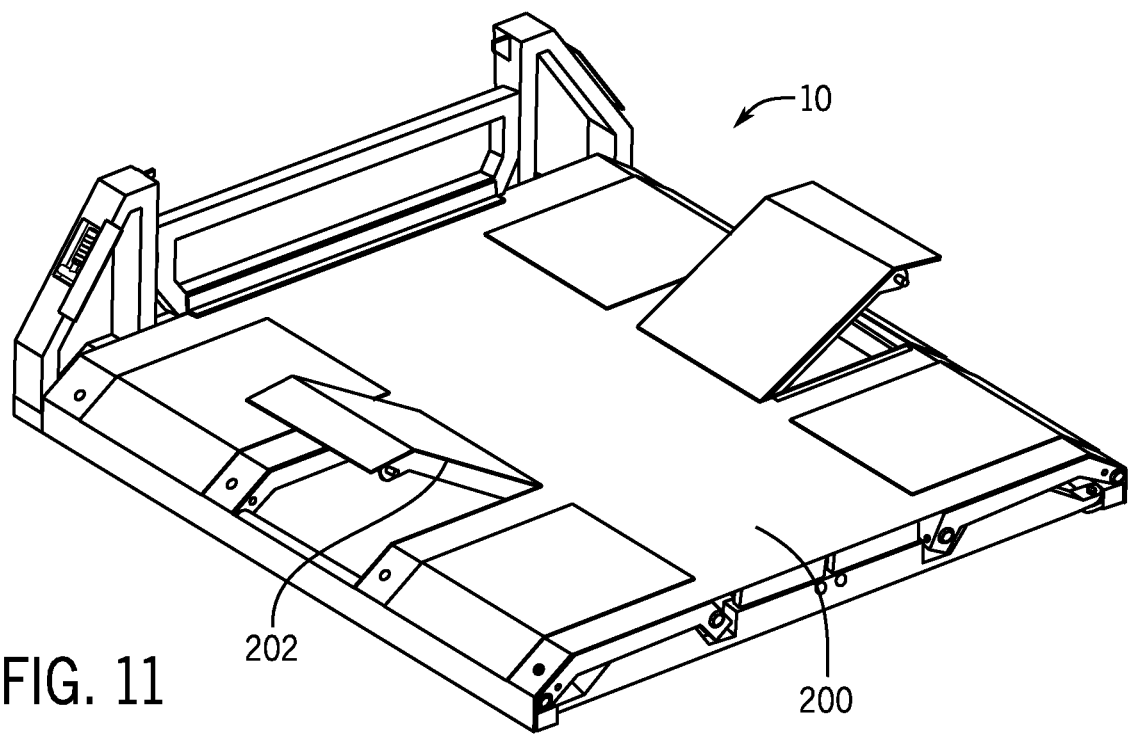
FIG. 11 is a perspective view of an embodiment of the rack assembly in the first configuration with a cover.

Turning to FIG. 11, a perspective view of an embodiment of the rack assembly in the first configuration with a cover 200 is shown. Rack assembly 10 may further comprise a cover 200, comprising at least one flap 202 which covers and allows use of each subpanel 64. Cover 200 may be attached to rack assembly 10 by fasteners including, but not limited to, straps, strings, snaps, hooks, or zip ties.

Figure 12:
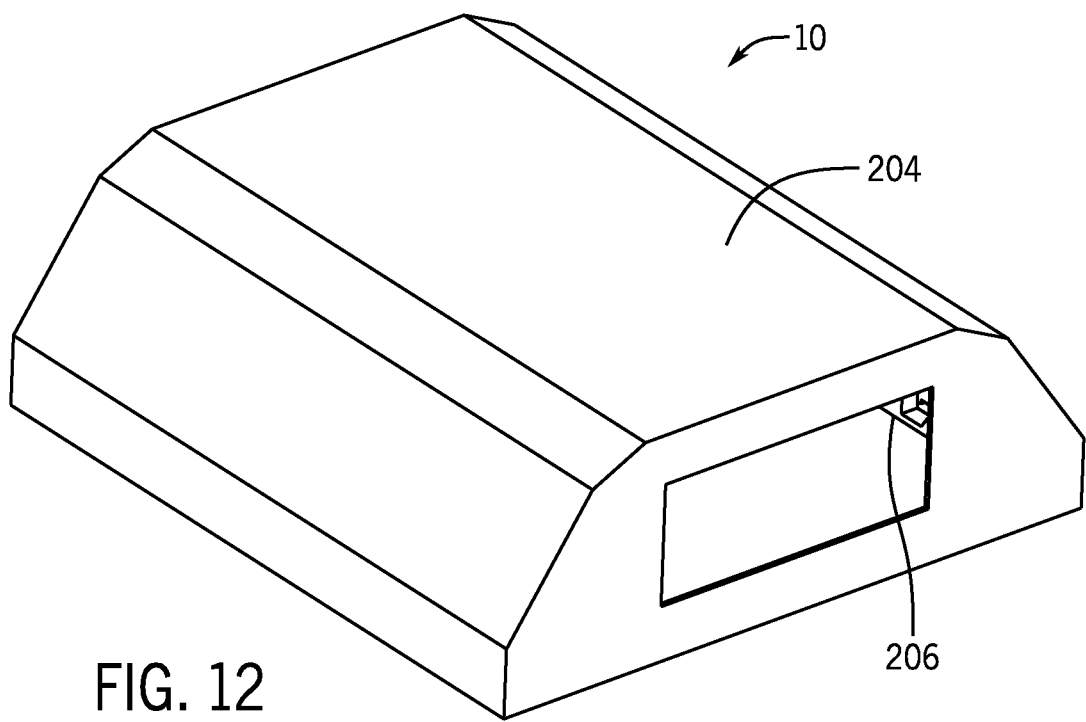
FIG. 12 is a perspective view of an embodiment of the rack assembly in the second configuration with an alternative cover.

Turning to FIG. 12, a perspective view of an embodiment of the rack assembly in the second configuration with an alternative cover is shown. Rack assembly 10 may comprise a cover 204 when assembly 10 is in the second configuration. Cover 204 and cover 200 is configured to cover rack assembly 10 entirely and may be canvas, plastic, or other material which is known to operate as a material cover, common to tonneau covers. Cover 204 may further comprise a window 206 formed therethrough on the rear surface of cover 204, providing viewable access to bed 14. It is also contemplated cover 200 and cover 204 may be a single embodiment, allowing a single cover to operate with rack assembly 10 in both the first configuration and the second configuration.

Figure 13:
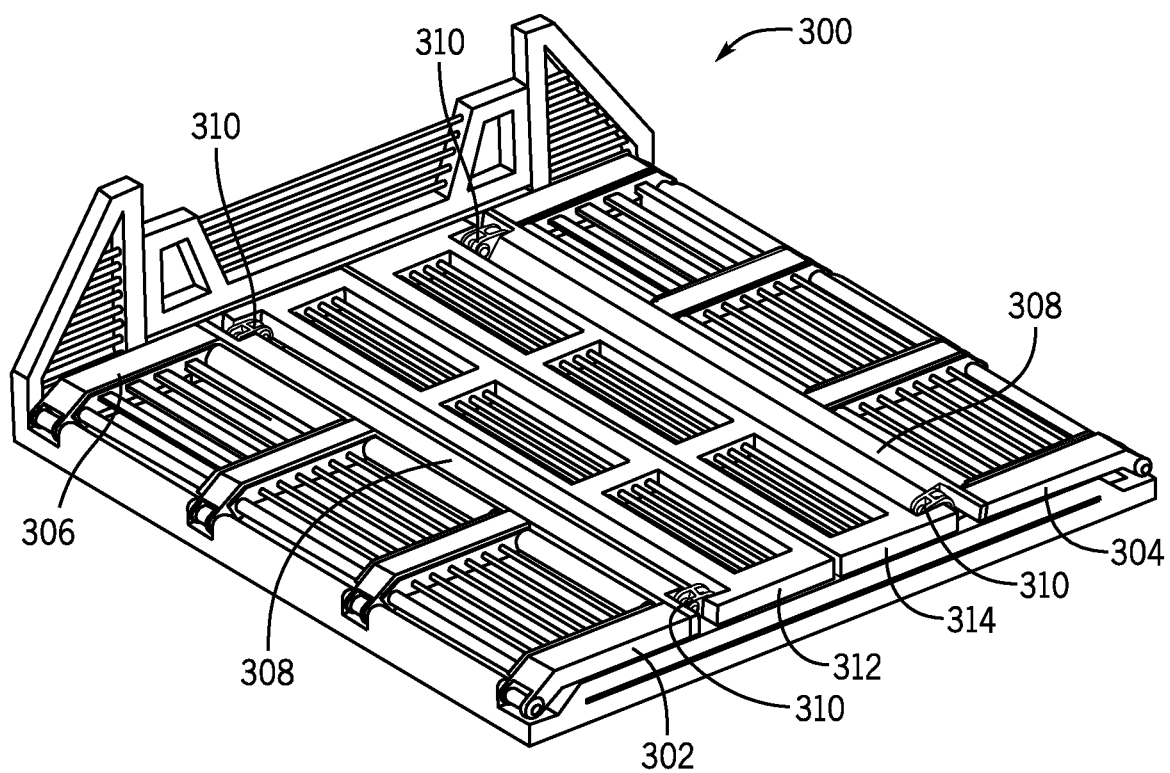
FIG. 13 is a perspective view of an alternative embodiment of the rack assembly in a first configuration.
Figure 14:
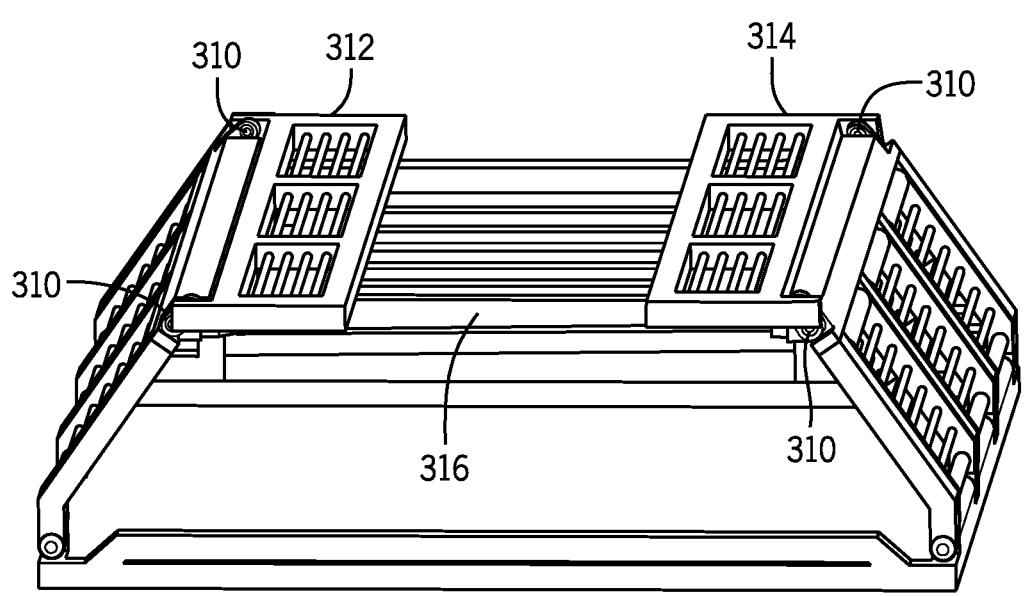
FIG. 14 is a perspective view of the alternative embodiment of the rack assembly in a second configuration.

Turning to FIGS. 13-14, a perspective view of an alternative embodiment of the rack assembly in a first configuration and a second configuration is shown. Rack assembly 300 comprises first panel 302 and second panel 304 in a different configuration wherein both panels comprise at least one lateral member 306 with only one end bent or angled. In addition, first panel 302 and second panel 304 contain a top bar 308 which runs across the entire length of each panel and connects to each panel's lateral members 306. Rack assembly 300 further comprises a first auxiliary panel 312 rotatably affixed to first panel 302 by at least one hinge 310 located on each end of one of the lengths of first panel 302 and first auxiliary panel 302. One side of hinge 310 pivotably connects to first panel 302 and a second side of hinge 310 pivotably connects to first auxiliary panel 312. Likewise, Rack assembly 300 further comprises a second auxiliary panel 314 rotatably affixed to second panel 304 by at least one hinge 310 located on each end of one of the lengths of second panel 304 and second auxiliary panel 314. One side of hinge 310 pivotably connects to second panel 304 and a second side of hinge 310 pivotably connects to second auxiliary panel 314. Further, each side of hinge 310 can rotate independent of the other side. Rack assembly 300 further comprises a crossbeam 316 similar to crossbeam 102. Turning to FIG. 14, this configuration allows first auxiliary panel 302 and second auxiliary panel 314 to rest on top of crossbeam 316 for additional cargo carrying capability, such as for transporting a kayak.

A method for adjusting a rack assembly from the first configuration to the second configuration includes unlocking arm 42 located in headache rack 34 from the first position 50 to a second position 52, then rotating first panel 54 to the desired angle (to coincide with lock mechanism 104 on left leg 38) and locking first panel 54 to headache rack 34 using lock mechanism 104, then rotating second panel 56 to the desired angle (to coincide with lock mechanism 104 on right leg 40) and locking the second panel using lock mechanism 104 to headache rack 34, and finally connecting a first crossbeam 102 to first panel 54 and second panel 56. Further, first auxiliary panel 58 is then adjusted to a desired angle and securing or locking in place, and second auxiliary panel 60 is adjusted to a desired angle and secured or locked in place.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. A rack assembly configured to attach to a vehicle comprising:
   a base frame comprising a first side member, a second side member, and a cross structure extending between the first side member and the second side member, wherein the base frame defines a base plane;
   a first panel pivotably coupled to the first side member; and
   a second panel pivotably coupled to the second side member;
   wherein the first panel and the second panel are movable between a first configuration in which the first panel and the second panel are co-planar and are oriented parallel to the base plane and a second configuration where the first panel and the second panel are each oriented at an angle to the base plane and the second configuration resembles the shape of a trapezoidal prism.

2. The rack assembly of claim 1 wherein the cross structure comprises a rotatable arm bar configured to secure first panel and second panel in a co-planar configuration in the first configuration and configured to secure to the cross structure when the first panel and second panel are in the second configuration.

3. The rack assembly of claim 2 wherein the cross structure is configured to lock the first panel and the second panel at an angle in relation to the base plane in the second configuration.

4. The rack assembly of claim 1 wherein the rack assembly further comprises a first cross member extending between the first side member and the second side member opposite the cross structure.

5. The rack assembly of claim 1 wherein the rack assembly further comprises at least one crossbeam extending between the first panel and the second panel in the second configuration.

6. A rack assembly configured to attach to a vehicle comprising:
   a base frame comprising a first side member, a second side member, and a cross structure extending between the first side member and the second side member, wherein the base frame defines a base plane;
   a first panel pivotably coupled to the first side member, the first panel further comprising at least one first subpanel pivotably coupled to the first panel via a rod;
   a second panel pivotably coupled to the second side member, the second panel further comprising at least one second subpanel pivotable coupled to the second panel via an additional rod;
   a first auxiliary panel pivotably coupled to the first panel via the rod; and
   a second auxiliary panel pivotably coupled to the second panel via the additional rod,
   wherein the first panel, second panel, first auxiliary panel, and second auxiliary panel are movable between a first configuration in which the first panel, the first auxiliary panel, the second panel, and the second auxiliary panel are co-planar and are oriented parallel to the base plane, and a second configuration wherein the first panel and the second panel are each oriented at an angle to the base plane and the first auxiliary panel and is configured at a different angle than the first panel and the second auxiliary panel is configured at a different angle than the second panel.

7. The rack assembly of claim 6 wherein the base frame is configured to cover a bed of the vehicle by connecting to side panels defining the bed.

8. The rack assembly of claim 6 or 1, wherein the rack assembly further comprises a cover positioned over the first panel and the second panel in the first configuration or the second configuration.

9. The rack assembly of claim 8, wherein the cover further comprises at least one flap configured to cover the at least one subpanel, the flap can move independent of the rest of the cover.

10. A method for adjusting a rack assembly from a first position to a second position comprising: unlocking an arm located in a headache rack of the rack assembly by rotating the arm toward the top of the headache rack, rotating a first panel to a desired angle and locking the first panel to the headache rack, rotating a second panel to a desired angle and locking the second panel to the headache rack, and connecting a cross beam to the first panel and the second panel.

11. The method of claim 10 which further comprises the additional steps of adjusting a first auxiliary panel connected to the first panel near or above the top of the headache rack to a first desired angle and locking the first auxiliary panel at the first desired angle, and adjusting a second auxiliary panel connected near or above the top of the headache rack to the second panel to a second desired angle and locking the second auxiliary panel at the second desired angle, where the first auxiliary panel and the second auxiliary panel are co-planar.

12. The rack assembly of claim 1 wherein the cross structure further comprises a first notch configured to receive a portion of at least one lateral member of the first panel and a second notch configured to receive a portion of at least one lateral member of the second panel in the first configuration.

13. The rack assembly of claim 1, wherein the rack assembly further comprises a rod and the first panel further comprises at least one subpanel assembly comprising a left side, a right side, at least one bar, and a handle, wherein the at least one bar and the handle are each fixed to the left side and the right side and the left side and the right side are configured to be in rotatable communication with the rod.

14. The rack assembly of claim 13, wherein the subpanel assembly is configured as an anchor point for accessories.

15. The subpanel assembly of claim 13, wherein the at least one subpanel assembly is located between the at least two first lateral members.

16. The rack assembly of claim 4 wherein the cross member further comprises a notch configured to receive a portion of at least one lateral member of the first panel and a notch configured to receive a portion of at least one lateral member of the second panel in the first configuration.

17. The rack assembly of claim 6 wherein in the second configuration, the first auxiliary panel is configured parallel with the first panel and also in communication with the interior of the first panel and the second auxiliary panel is configured parallel with the second panel and in communication with the interior of the second panel.

18. The rack assembly of claim 6 wherein the first panel, second panel, first auxiliary panel, and second auxiliary panel are moveable into a third configuration wherein the first panel and the second panel are each oriented at an angle to the base plane and the first auxiliary panel and the second auxiliary panel are configured parallel with the base plane and co-planar with each other.

19. The rack assembly of claim 1 wherein the first panel further comprises at least two first lateral members and the second panel further comprises at least two second lateral members.

20. A rack assembly configured to attach to a vehicle comprising:
- a base frame comprising a first side member, a second side member, and a cross structure extending between the first side member and the second side member, wherein the base frame defines a base plane;
- a first panel pivotably coupled to the first side member;
- a second panel pivotably coupled to the second side member;
- a first auxiliary panel pivotably coupled to the first panel; and
- a second auxiliary panel pivotably coupled to the second panel,
- wherein the first panel, second panel, first auxiliary panel, and second auxiliary panel are movable between a first configuration in which the first panel, the first auxiliary panel, the second panel, and the second auxiliary panel are co-planar and are oriented parallel to the base plane, and at least a second configuration wherein the first panel and the second panel are each oriented at an angle to the base plane and the first auxiliary panel is rotated inwardly to be configured parallel with the first panel and also in communication with the interior of the first panel and the second auxiliary panel is configured parallel with the second panel and in communication with the interior of the second panel.

* * * * *